UNITED STATES PATENT OFFICE.

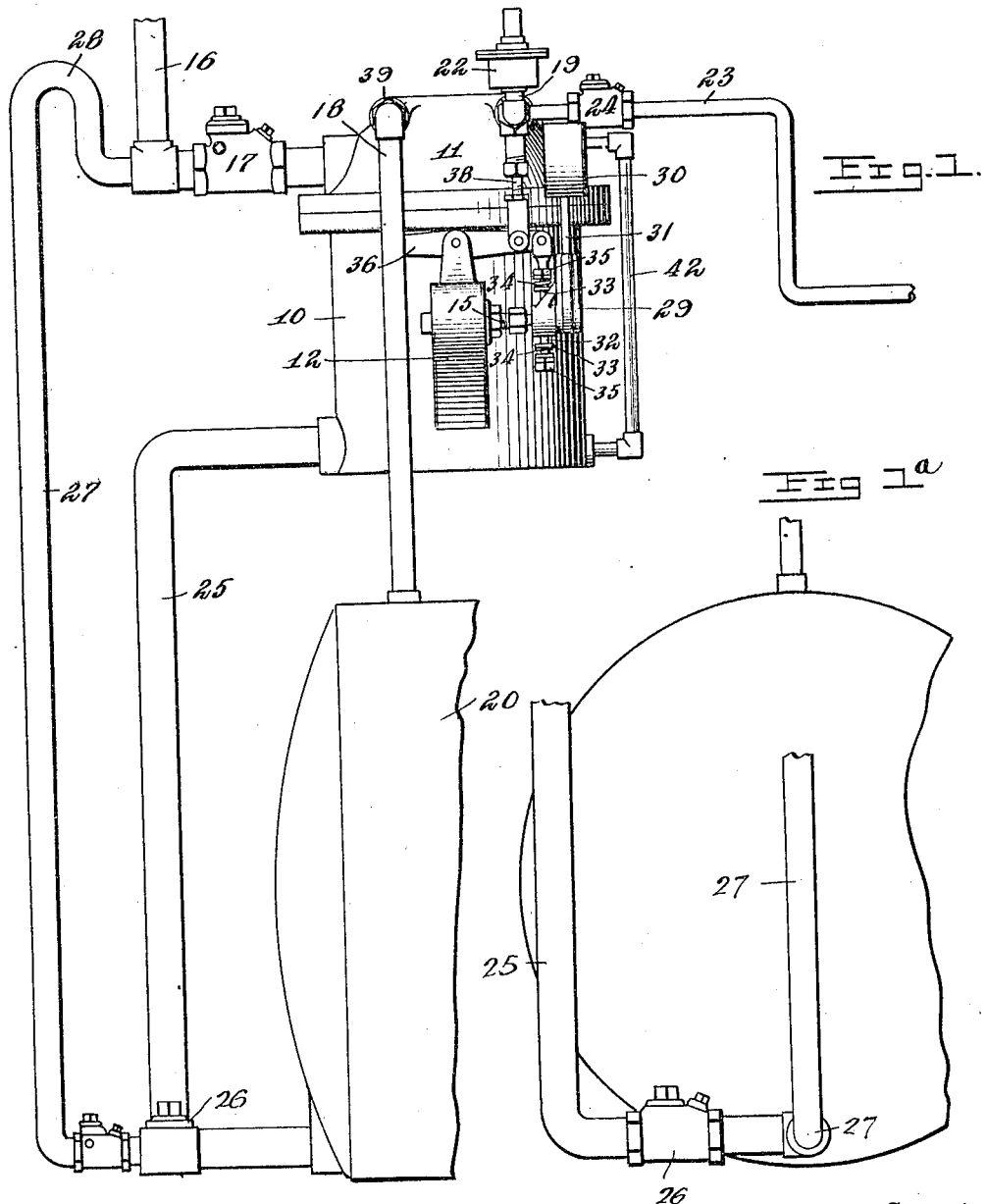

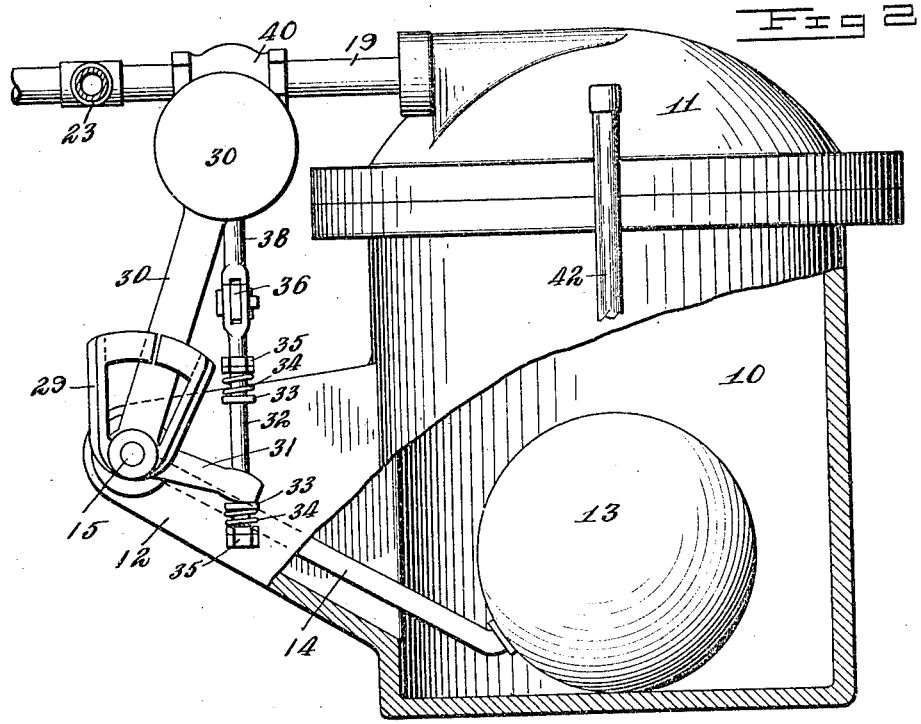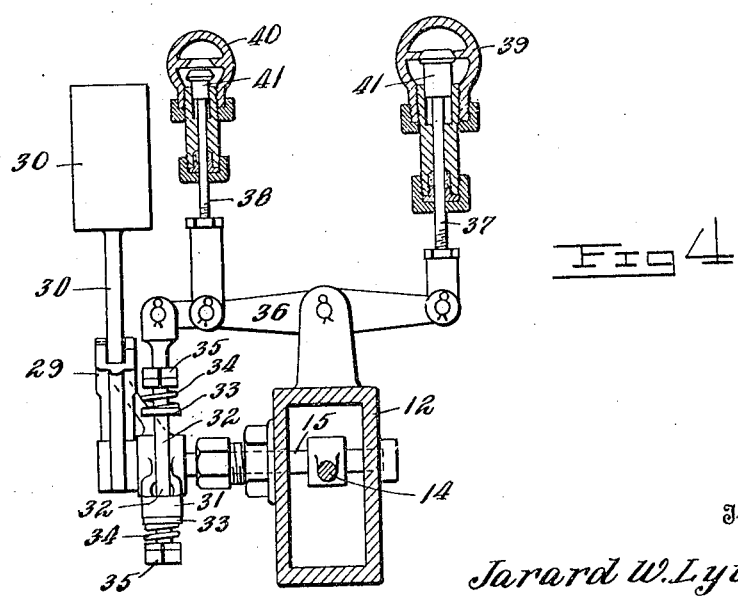

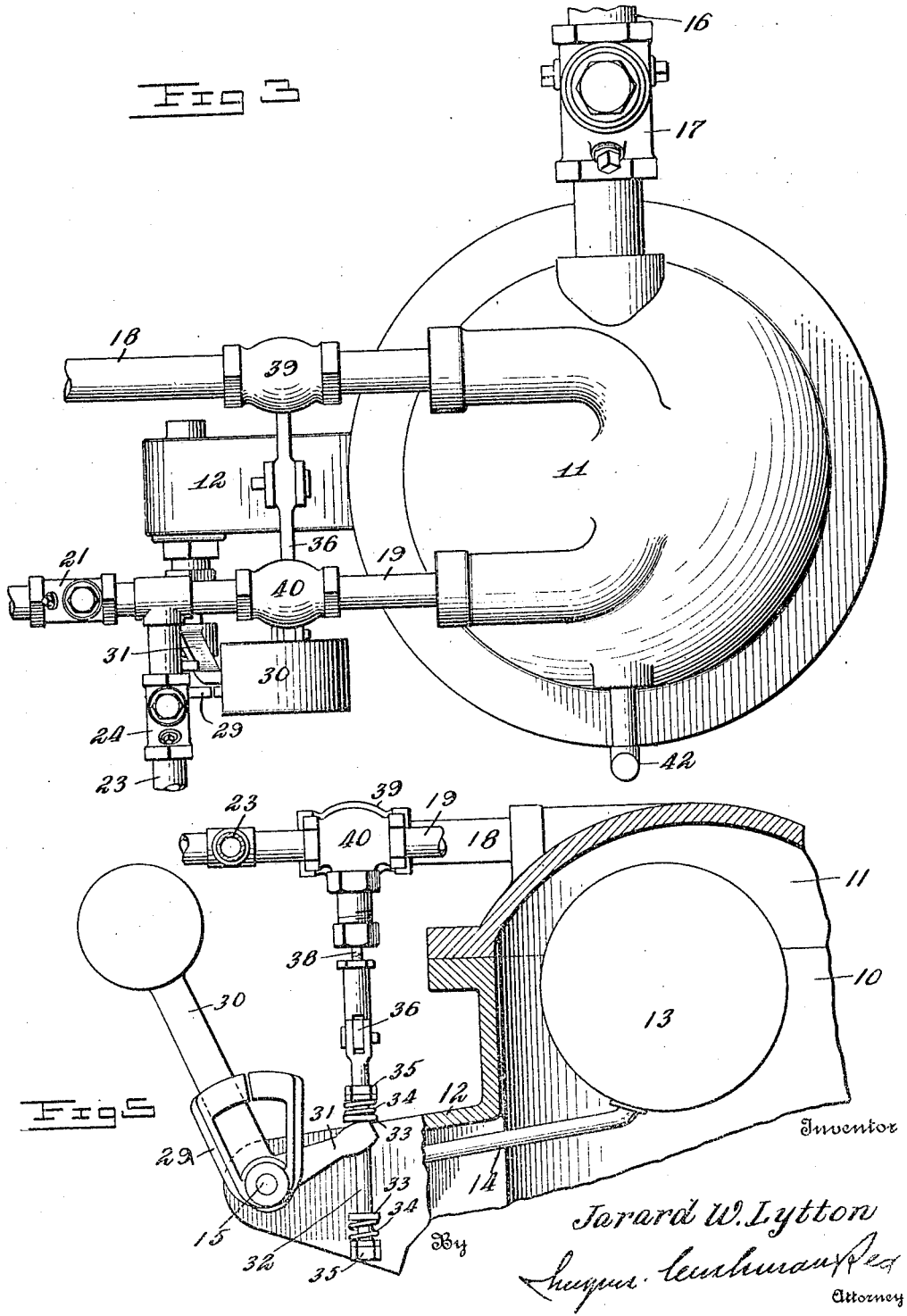

JARARD W. LYTTON, OF FRANKLIN, VIRGINIA, ASSIGNOR TO LYTTON MANUFACTURING CORPORATION, OF FRANKLIN, VIRGINIA, A CORPORATION OF VIRGINIA.

STEAM-TRAP.

1,291,962.  Specification of Letters Patent.  Patented Jan. 21, 1919.

Application filed April 3, 1915. Serial No. 18,959.

*To all whom it may concern:*

Be it known that I, JARARD W. LYTTON, a citizen of the United States, residing at Franklin, in the county of Southampton and State of Virginia, have invented new and useful Improvements in Steam-Traps, of which the following is a specification.

This invention relates to steam traps and has for an object to provide a trap of this nature for use in steam systems to collect the water of condensation from the system, and to automatically return the water under pressure to the boiler.

Other objects of this invention are; to provide a steam trap of this character wherein the water of condensation is admitted to the trap at its upper end so that any air in the system is free to pass off through a vent in the top of the trap, and the necessity of forcing the air through water of condensation collected in the trap is avoided; to provide a device which has a vent in the top thereof through which air accumulating in the trap may escape; to provide a thermostatic valve to automatically close the vent when the air is expelled from the trap to prevent the exhaust of steam from the trap; to provide a return check to prevent atmospheric air entering the vent of the trap when there is a tendency to create a vacuum in the trap; and to provide a branch leading from the vent to the system for returning steam from the trap back to the system; the branch having a check valve therein to prevent the back pressure of the steam into the vent.

An important object of this invention is to provide steam inlet and relief valves which are positively actuated, and which cannot stick by accumulations of scale and other foreign substances collected in the system; a device which is of comparatively simple structure, economical in manufacture and use, and one which may be readily installed without material alterations in any system; and to provide a trap of this character which greatly simplifies the construction and operation of prior traps, and in which the operation is positive and direct.

The above and other objects and advantages of this invention will be more clearly understood from the following detail description of the present preferred embodiment of the invention, the same being shown in the accompanying drawings, wherein,—

Figure 1 is a front elevation of the improved steam trap having its installation in a steam system.

Fig. 1ª illustrates in side elevation the connections between the trap and the boiler of the system.

Fig. 2 is a side elevation of the trap in detail and enlarged, part of the same being broken away to show the float and construction of the casing.

Fig. 3 is a top plan view of the trap.

Fig. 4 is a transverse section taken through the steam inlet and relief valves and looking away from the casing.

Fig. 5 is a fragmentary side elevation of the trap showing the upper end partly in section and in adjustment with the float in the top of the trap.

Referring to these drawings, wherein similar parts are indicated by like reference numerals throughout the several views, the trap body or casing is designated as 10 and is of preferably cylindrical form, as shown, 11 is the cover or dome, and 12 is a hollow lateral projection at one side and near the bottom of the casing. A suitable float 13 is disposed in the casing 10, and is mounted on a float arm 14. The arm 14 is secured to a suitable shaft 15 journaled transversely in the outer end of the projection 12, and having one end extending therefrom. This float 13 is adapted to be raised in the casing 10 by water of condensation collected from a steam system by a pipe 16, having a non-return check valve 17 therein, and opening into the top or dome 11 of the trap, so that air or steam accumulating in the water of condensation may remain in the top of the trap, and the water may fall to the bottom of the trap and be separated from the steam and air.

The cover or dome 11 of the trap is provided with two additional pipes; a steam inlet pipe 18, and an air and steam relief or vent pipe 19. The steam inlet pipe 18 leads preferably directly from the top of a boiler 20, to the top of the trap, while the relief pipe 19 opens from the top of the trap to the atmosphere, and has a non-return check valve 21 and a thermostatic valve 22 therein. The thermostatic valve 22 permits the escape of air from the top of the trap, and automatically closes the vent upon the escape of steam from the vent. The check valve 21 prevents the return of atmospheric air to the top of the trap upon the cutting off of the steam supply and the tendency to form a partial vacuum in the top of the trap by the condensation of the steam. The relief pipe 19 is provided with a branch pipe 23 leading back to the steam system so as to prevent any excess pressure of steam in the top of the trap upon the closing of the thermostatic valve 22 to afford a suitable vent for the steam from the trap, and to equalize the pressure in the system. This branch pipe 23 is also provided with a non-return check valve 24 which insures the passage of the steam outwardly from the trap, and prevents the return of the steam from the system through the pipe 23.

Leading from the bottom of the trap casing 10 is a water return pipe 25 terminating in the lower portion of the boiler 20 to return the water of condensation thereto from the trap. This pipe 25 is provided with a check valve 26 to prevent the rise of water from the boiler into the trap under the pressure of the steam in the system.

A by-pass pipe 27 is connected at one end to the water inlet pipe 16 and at its other end empties into the lower end of the boiler 20, to take care of any abnormal flow of water in the pipe 16. The pipe 27 has a dam 28 at its upper end in the form of an inverted U pipe to prevent the normal flow of the water of condensation from flowing directly to the boiler.

The float 13 rises and falls with the passage of water of condensation through the trap and positively actuates the valves for admitting the steam to the top of the trap to expel the accumulated water of condensation therefrom and for admitting of the venting of the accumulated air and excess steam pressure from the top of the trap.

To accomplish this result the invention contemplates a relatively simple and positively actuated mechanism for opening and closing the steam inlet and relief valves. This mechanism comprises a segment 29 secured upon the outer end of the shaft 15 at one side of the hollow projection 12. This segment is adapted to swing with the float 13, admit of the free operation of a weight lever 30 therein, and to carry the weight lever 30 beyond its center of gravity during the rise and fall of the float, whereby the lever 30 may swing into one or the other of the positions shown in Figs. 2 and 5.

The weight lever carries a suitable weight or is enlarged at its upper end for the purpose of insuring the dropping of the weight lever 30 from one side or the other of its center of gravity when actuated by the segment 29. The weight lever is hinged upon the shaft 15 adjacent the segment 29, and is provided with an inwardly extending arm 31 which is suitably formed or apertured at its outer end for engagement about a rod 32 and adapted for movement longitudinally thereon.

This rod 32 is provided near its upper and lower ends with abutting plates 33 which are yieldingly held by springs 34 which are secured adjustably to the rod by lock nuts 35. The arm 31 is adapted to swing between the abutment plates 31 and to strike and to slightly move these plates at the ends of its up and down movements and to carry the rod 32 therewith. The upper end of the rod is pivoted to a rock lever 36 pivoted intermediate its ends upon the projection 12 of the casing. The opposite ends of the rock lever 36 are positively and pivotally connected to the lower ends of valve stems 37 and 38 for the steam inlet valve 39 and relief valve 40 respectively.

As may be observed from Fig. 4 of the drawings the valve stems 37 and 38 are not only positively secured to the rock lever 36, and are thus positively actuated by the weight lever 30, but these valve stems have fixed thereon the valve heads 41 which operate in their respective valve casings to positively control the steam inlet and relief valves of the trap.

The trap is disclosed in Fig. 1 as being located a short distance above the top of the boiler 20. If it is desired a sight glass 42 may be mounted upon the trap at one side thereof, as shown in Fig. 2, so that the height of water of condensation collecting in the trap may be observed.

It is of course understood that it is within the spirit of this invention to vary the details of construction of the above entitled steam trap, and to proportion the parts as may be found advantageous for various uses to which the steam trap may be put, these changes or modifications being restricted only by the scope of the following claims.

What is claimed is:—

1. In combination with a steam system including a boiler; a casing; a water feed pipe leading from the system to the top of the casing; a water return pipe leading from the bottom of the casing to said boiler; a steam supply pipe leading from the boiler to the top of the casing; a vent pipe leading from the top of the casing; valves in the vent pipe regulating the escape of air to the atmosphere; a branch pipe leading from the vent pipe to the system to return steam to the system when said first valves are closed; and mechanically controlled valves in said steam and vent pipes, means for alternately controlling said valves comprising a rocker arm pivoted to and exterior to the casing, whereby said valves may be alternately opened and closed to control the passage of steam to the casing.

2. In combination with a steam system including a boiler; a casing; a water feed pipe leading from the system to the top of the casing; a water return pipe leading from the bottom of the casing to said boiler; a steam supply pipe leading from the boiler to the top of the casing; a vent pipe leading from the top of the casing; valves in the vent pipe regulating the escape of air to the atmosphere; a branch pipe leading from the vent pipe to the system to return steam to the system when said first valves are closed; and a by-pass pipe from said water feed pipe to the boiler and having a dam therein to direct water to the casing, the by-pass pipe being adapted to carry off abnormal flow of water from the water feed pipe.

3. In a steam system; a vent pipe; a thermostatic valve in the pipe to admit escape of air and prevent escape of steam from the system; a check valve in the pipe to prevent ingress of atmospheric air to the system; and a branch pipe leading back to the system to direct steam thereto from the vent pipe upon the closing of the thermostatic valve.

4. A steam trap comprising a single casing having a water inlet at its upper end and a water outlet at its lower end; a steam inlet pipe opening into the upper end of the casing; a vent pipe leading from the top of the casing; valves in said steam and vent pipes; valve stems depending from the valves; a rocker arm pivoted at its opposite ends to said valve stems whereby to alternately and positively open and close the valves; a weighted arm pivoted to and exterior to the casing and having pivoted connection with said rocker arm; and a float in the casing adapted to rise and fall with the passage of water therethrough for swinging said weighted arm in opposite directions.

5. In a steam trap for steam systems, and in combination, a casing having at its lower end a water return passage, a dome for said casing having a water feed pipe leading from the steam system, a steam inlet pipe leading from the system and an air outlet pipe, a valve controlling said steam inlet pipe, a valve controlling said air outlet pipe, a rocker arm pivoted to and exterior to said casing and controlling said steam inlet and air outlet valve, float operated means for actuating said rocker arm to alternately open and close said valve, a thermostatic valve in said air outlet pipe to prevent the escape of steam therethrough, and a branch pipe leading from the air outlet pipe to the system.

In testimony whereof I have hereunto set my hand.

JARARD W. LYTTON.

Copies of this patent may be obtained for five cents each, by addressing the "Commissioner of Patents, Washington, D. C."